United States Patent
Rajkotia et al.

(10) Patent No.: US 7,283,818 B2
(45) Date of Patent: Oct. 16, 2007

(54) APPARATUS AND METHOD USING PAGE RESPONSE MESSAGES TO CHANGE THE SLOT CYCLE INDEX OF A SELECTED MOBILE STATION IN A WIRELESS NETWORK

(75) Inventors: Purva R. Rajkotia, Plano, TX (US); Sanjaykumar Kodali, Dallas, TX (US); Chanakya Bandyopadhyay, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 10/763,483

(22) Filed: Jan. 23, 2004

(65) Prior Publication Data

US 2005/0164741 A1    Jul. 28, 2005

(51) Int. Cl.
*H04Q 7/20* (2006.01)
*H04Q 7/24* (2006.01)

(52) U.S. Cl. .................. 455/434; 455/515; 370/311; 370/350

(58) Field of Classification Search ........... 455/436, 455/561, 434
See application file for complete search history.

(56) References Cited

U.S. PATENT DOCUMENTS

| | | | |
|---|---|---|---|
| 6,560,453 B1* | 5/2003 | Henry et al. | 455/67.11 |
| 6,882,973 B1* | 4/2005 | Pickering | 704/270 |
| 2003/0114156 A1* | 6/2003 | Kinnavy | 455/434 |
| 2005/0007973 A1* | 1/2005 | Jang et al. | 370/319 |
| 2005/0164705 A1* | 7/2005 | Rajkotia et al. | 455/436 |

\* cited by examiner

*Primary Examiner*—Erika A. Gary

(57) ABSTRACT

A wireless network base station for controlling use of the reduced slot cycle mode by a selected mobile station communicating with the base station. The base station comprises: 1) a message controller for transmitting a Page message to a first mobile station notifying the first mobile station that a data session between the base station and the first mobile station is being activated; and 2) a reduced slot cycle controller coupled to the message controller for receiving from the first mobile station a Page Response message comprising a minimum reduced slot cycle index (SCI) value requested by the first mobile station. The reduced slot cycle controller, in response to receipt of the Page Response message, causes the message controller to transmit to the first mobile station a Release Order message comprising a selected slot cycle index (SCI) value at which the first mobile station will operate.

24 Claims, 12 Drawing Sheets

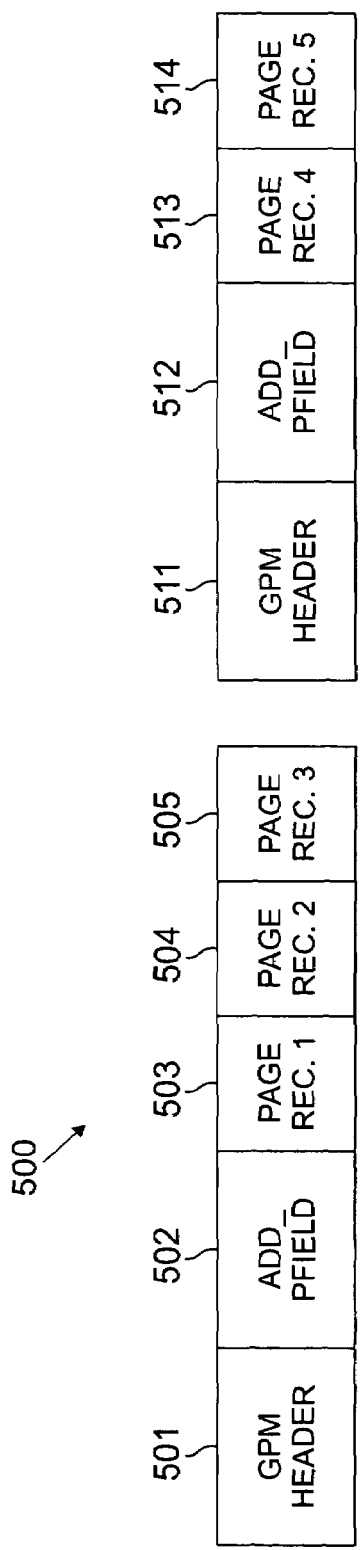
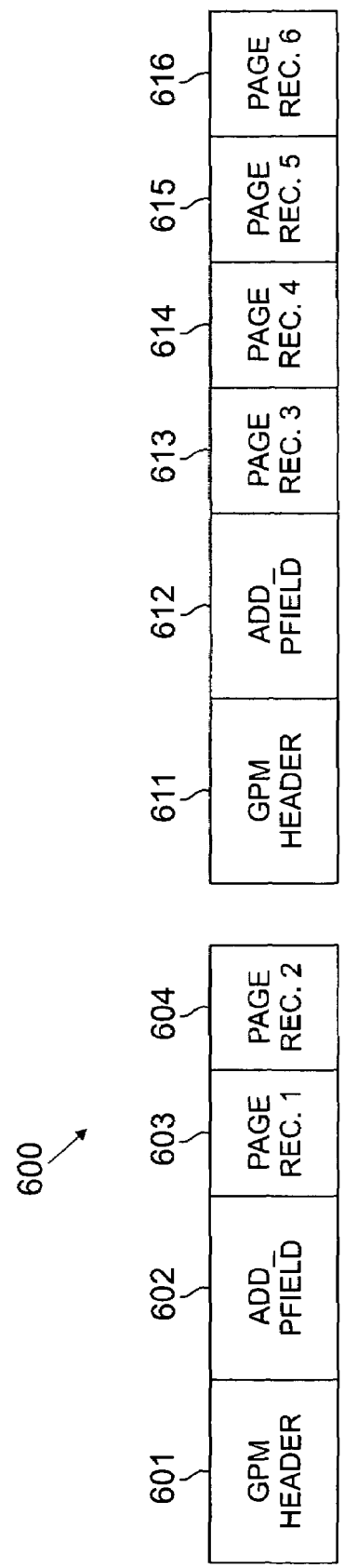
FIG. 5
FIG. 6

APPARATUS AND METHOD USING PAGE RESPONSE MESSAGES TO CHANGE THE SLOT CYCLE INDEX OF A SELECTED MOBILE STATION IN A WIRELESS NETWORK

CROSS-REFERENCE TO RELATED APPLICATION

This present invention is related to those disclosed in:
1) U.S. patent application Ser. No. 10/659,449, entitled "SYSTEM AND METHOD FOR PROVIDING FAST CALL SET-UP IN A WIRELESS COMMUNICATION SYSTEM," filed Sep. 10, 2003;
2) U.S. patent application Ser. No. 10/764,062, entitled "APPARATUS AND METHOD FOR SELECTIVELY CHANGING THE SLOT CYCLE INDEX IN A WIRELESS NETWORK," filed concurrently herewith; and
3) U.S. patent application Ser. No. 10/764,164, entitled "APPARATUS AND METHOD USING RELEASE ORDER MESSAGES TO CHANGE THE SLOT CYCLE INDEX OF A SELECTED MOBILE STATION IN A WIRELESS NETWORK," filed concurrently herewith.

The subject matter disclosed in application Ser. Nos. 10/659,449, 10/764,062, and 10/764,164 is hereby incorporated by reference into the present disclosure as if fully set forth herein.

TECHNICAL FIELD OF THE INVENTION

The present invention is generally related to wireless networks and, in particular, to a wireless network in which the slot cycle index may be selectively changed using the paging and traffic channels.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (e.g., vending machine with cell phone capability). Wireless service providers continually try to create new markets for wireless devices and expand existing markets by making wireless devices and services cheaper and more reliable. The prices of wireless devices have decreased to the point where nearly everyone can afford them. To continue to attract new customers, wireless service providers are implementing new services, especially digital data services that, for example, enable a user (or subscriber) to browse the Internet and to send and receive e-mail.

Mobile stations (e.g., cell phones, PCS handsets, portable computers, telemetry devices, and the like) frequently operate from an external power source connected to the mobile station. When the external power source is not connected, an internal battery provides a limited period of operation. Mobile stations that operate from batteries for longer periods of time offer increased value to users and competitive advantages for service providers and equipment vendors.

The duration of mobile station battery operation has often been extended using techniques that lower power consumption when the mobile station is in an idle state and not transferring voice or data traffic. A mobile station may enable one or more power saving configurations when it is in the idle state. For instance, the mobile station may disable its transmitter during the idle state, decreasing the amount of power required for idle state operation. A mobile station may further reduce its idle state power requirements by enabling a slotted mode of operation with a base station.

A mobile station enters the idle state when the mobile station is turned on, is synchronized with the system, and has no calls in progress. During the idle state, a mobile station actively listens to a paging channel for information. This information includes overhead messages, such as system parameter messages, as well as messages directly addressed to the mobile station from a base station. A mobile station in the idle state may operate from a battery or from an external power source.

During the idle state, the mobile station may communicate with a base station in a non-slotted or a slotted mode. A typical paging channel slot is an 80-millisecond time slot within a paging slot cycle. The paging slot cycle ranges from 16 time slots (1.28 seconds) to 2048 time slots (163.84 seconds). In the non-slotted mode, the mobile station monitors all paging channel slots for messages from the base station. In the slotted mode, the mobile station only monitors a selected subset of the paging channel slots for messages from the base station. During time periods when the mobile station is not monitoring the selected subset of paging channel slots, power is turned off in the mobile station RF receiver in order to save additional power. A mobile station extends the battery supply operating life by entering a slotted mode of operation with the base station because the mobile station receiver consumes power only during selected slot cycles rather than across the entire paging cycle.

In earlier wireless networks, such as Release B of cdma2000 (i.e., IS-2000-B), the mobile station could select a full slot cycle index, r, between 0 and 7 (i.e., 000-111). The slot cycle index, r, gives the period, P, of the slotted mode of operation according to the equation:

$$P=(2)^r \times 1.28 \text{ seconds.} \quad [\text{Eqn. 1}]$$

Thus, for example, if the full slot cycle index, r, is 0, the period of the slotted mode is 1.28 seconds. If the full slot cycle index, r, is 7, the period of the slotted mode is 163.84 seconds.

However, the latest generation of wireless terminals, particularly cell phones and other mobile stations, incorporate new features and applications that require very fast messaging. Many of these new features cannot operate with full cycle slotted mode periods of 1.28 seconds or greater. For example, many cell phones and other wireless mobile stations (e.g., Palm Pilot) support interactive gaming applications that enable the operator of one mobile station to play against the operator of another mobile station. However, a gaming application that requires fast, real-time interactions cannot properly operate in a slotted mode that has a minimum period of 1.28 seconds.

Another new application that is adversely affected by full cycle slotted mode operation is Push-to-Talk service, such as the Direct Connect$^{SM}$ service available from Nextel. A Push-to-Talk service allows two mobile stations to operate as walkie-talkies. A call connection is set up between a first mobile station and a second mobile station. After the call connection is established, the operators may let both mobile stations enter idle states. At any point in time, the operator of the first mobile station can simply press a button on the first mobile station and say, "Hey what are you up to?" and the operator of the second mobile station can hear the voice message immediately and respond. However, a Push-to-Talk application cannot properly operate with a slotted mode that has a minimum period of 1.28 seconds.

In order to perform fast messaging in gaming applications and Push-to-Talk services, the latest generation of mobile stations are capable of entering a reduced slot cycle mode (or negative slot cycle mode) when the mobile station is in a slotted mode of operation. In reduced slot cycle mode, the mobile station selects a reduced slot cycle index, r, between −4 and 7. As before, the slot cycle index, r, gives the period, P, of the slotted mode of operation according to the equation:

$$P=(2)^r \times 1.28 \text{ seconds.} \quad [\text{Eqn. 2}]$$

Because the slot cycle index, r, can be a negative value, slot cycle periods of less than 1.28 seconds are possible. For example, if the reduced slot cycle index, r, is −4, the reduced slot cycle period of the slotted mode is 80 milliseconds. If the reduced slot cycle index, r, is −3, the reduced slot cycle period of the slotted mode is 160 milliseconds. If the reduced slot cycle index is −2, the reduced slot cycle period of the slotted mode is 320 milliseconds, and so forth.

Unfortunately, the widespread use of reduced slot cycle mode by a large number of mobile stations creates considerable scheduling problems in the base station. When paging slot cycles are 1.28 seconds or greater, the base station has the luxury of being able to flexibly schedule the transmission of paging messages to nearby mobile stations. However, when slot cycles are only 80 milliseconds long, the base station is less able to schedule transmissions in an optimal manner. Under some heavily loaded conditions, the benefits of shorter paging cycles become reduced.

Furthermore, certain applications, such as QCHAT, may require a first group of mobile stations to monitor the paging channel of a base station more frequently than a second group of mobile stations. Continually operating the second group of mobile stations in the reduced slotted mode unnecessarily drains the batteries of the second group of mobile stations and reduces battery life. However, operating the first group of mobile stations in a normal mode of operation (non-reduced slotted mode) has a negative impact on application performance.

Therefore, there exists a need for improved systems and methods of controlling the use of reduced slot cycle mode of operation by mobile stations in a wireless network.

SUMMARY OF THE INVENTION

The present invention discloses a technique for selectively changing the slot cycle index (SCI) of a particular mobile station using the paging channel and the traffic channel without impacting the battery life and the application performance of other mobile stations.

To address the above-discussed deficiencies of the prior art, it is a primary object of the present invention to provide, for use in a wireless network, a base station capable of controlling the use of the reduced slot cycle mode by a selected one of a plurality of mobile stations communicating with the base station. According to an advantageous embodiment of the present invention, base station comprises: 1) a message controller capable of transmitting a Page message to a first mobile station notifying the first mobile station that a data session between the base station and the first mobile station is being activated; and 2) a reduced slot cycle controller coupled to the message controller capable of receiving from the first mobile station a Page Response message comprising a minimum reduced slot cycle index (SCI) value requested by the first mobile station, wherein the reduced slot cycle controller, in response to receipt of the Page Response message causes the message controller to transmit to the first mobile station a Release Order message comprising a selected slot cycle index (SCI) value at which the first mobile station will operate.

According to one embodiment of the present invention, a slot cycle duration corresponding to the selected SCI value transmitted by the base station is different than a slot cycle duration corresponding to the minimum reduced slot cycle index (SCI) value requested by the first mobile station.

According to another embodiment of the present invention, the slot cycle duration corresponding to the selected SCI value transmitted by the base station is at least as great as a slot cycle duration corresponding to the minimum reduced slot cycle index (SCI) value requested by the first mobile station.

According to still another embodiment of the present invention, the Page Response message further comprises a requested time period during which the first mobile station will operate using the reduced slot cycle index (SCI) value requested by the first mobile station, and wherein the Release Order message further comprises a selected time period during which the first mobile station will operate using the selected SCI value.

According to yet another embodiment of the present invention, the selected time period transmitted by the base station is different than the requested time period requested by the first mobile station.

According to a further embodiment of the present invention, the selected time period transmitted by the base station is at least as great as the requested time period requested by the first mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 5 illustrates a technique for changing the slot cycle index of a particular mobile station using a separate General Page message according to one embodiment of the present invention;

FIG. 6 illustrates a technique for changing in mass the slot cycle indexes of a group of mobile stations using General Page messages according to one embodiment of the present invention;

DETAILED DESCRIPTION OF THE INVENTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
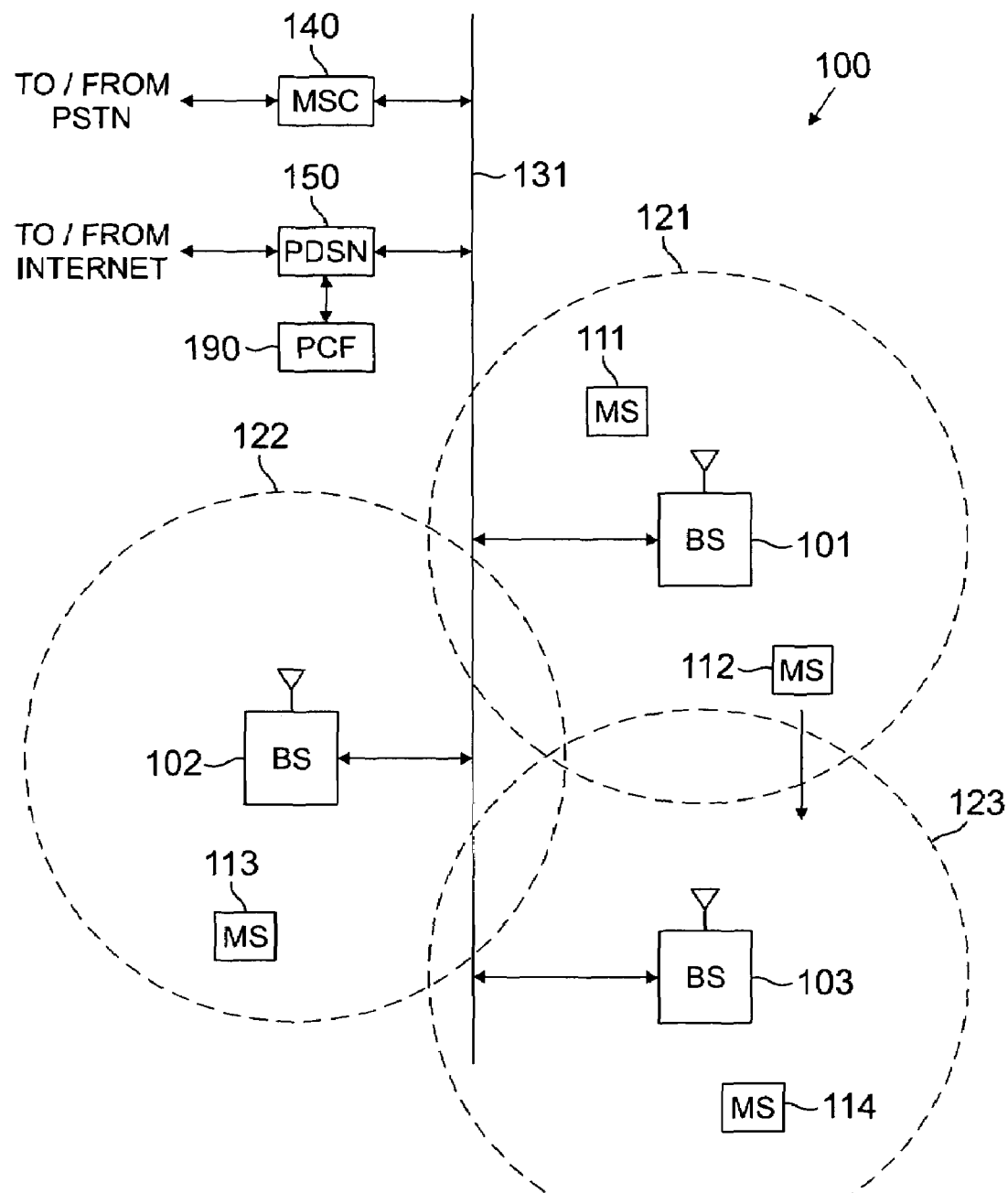
FIG. 1 illustrates an exemplary wireless network in which base stations control the use of the reduced slot cycle mode of operation by mobile stations according to the principles of the present invention.

FIG. 1 illustrates exemplary wireless network 100 in which base stations control the use of the reduced slot cycle mode of operation by mobile stations according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, the mobile stations operating in wireless network 100 are capable of operating in a reduced slot cycle mode of operation (also called a negative slot cycle mode of operation). However, in order to prevent the use of the reduced slot cycle mode of operation from interfering with the optimal scheduling of paging messages on the paging channel, base stations 101-103 of wireless network 100 are capable of enabling and disabling the use of the reduced slot cycle mode of operation by some or all of mobile stations 111-114. Base stations 101-103 turn the reduced slot cycle capability on or off by setting a flag indicator in an overhead channel (e.g., paging channel) or, alternatively, in a selected traffic channel. According to one embodiment of the present invention, once a predetermined threshold level of mobile station traffic is reached by a base station, the base station sets the flag indicator to OFF. This prevents additional mobile stations from entering the reduced slot cycle mode of operation.

Figure 2:
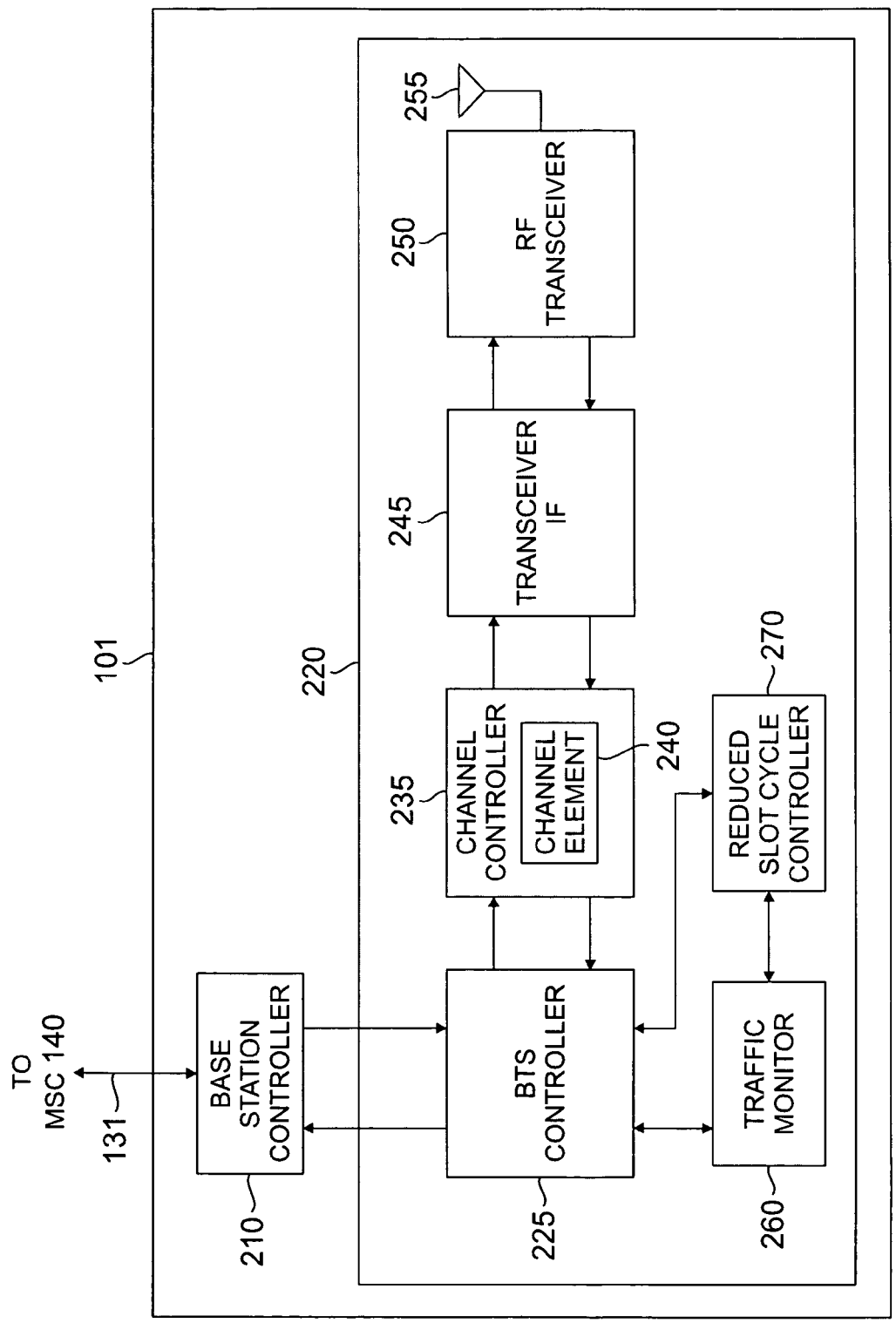
FIG. 2 illustrates in greater detail an exemplary base station according to one embodiment of the present invention.

FIG. 2 illustrates exemplary base station 101 in greater detail according to one embodiment of the present invention. Base station 101 comprises base station controller (BSC) 210 and base transceiver subsystem (BTS) 220. Base station controllers and base transceiver subsystems were described previously in connection with FIG. 1. BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises traffic monitor 260 and reduced slot cycle controller 270.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In an advantageous embodiment of the present invention, the channel elements communicate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to an exemplary embodiment of the present invention, traffic monitor 260 and reduced slot cycle controller 270 are capable of restricting use of the reduced slot cycle mode by mobile stations 111-114. Traffic monitor 260 is associated with BTS controller 225 and monitors the number of mobile stations handled by BS 101, the amount of voice and data traffic handled by BS 101, and the number of mobile stations operating in reduced slot cycle mode. Reduced slot cycle controller 270 receives the monitored traffic statistics from traffic monitor 260 and compares the traffic statistics to one or more predetermined threshold parameters. If reduced slot cycle controller 270 determines that the traffic load handled by base station 101 is interfering with the optimal scheduling of paging messages in the paging channel, reduced slot cycle controller 270 restricts the use of reduced slot cycle mode by causing BTS controller 225 to transmit a control message containing a flag indicator in an overhead channel (e.g., paging channel) or, alternatively, in a selected traffic channel.

According to the principles of the present invention, base station 101 may add a flag to an overhead message (e.g., system parameters message, extended system parameters message) or a traffic channel message (e.g., ITSPM, UHDM, GHDM) to indicate whether or not base station 101 supports the reduced slot cycle mode. Even if a mobile station informs base station 101 that the mobile station supports this capability, base station 101 can still override the mobile station capability and force the mobile station to work in the normal (or full slot cycle) mode of operation.

According to an exemplary embodiment, base station 101 indicates in the overhead messages that base station 101 supports reduced slot cycle mode of operation by initially enabling the flag indicator. Thus, any mobile station is initially capable of invoking the reduced slot cycle index feature. Thereafter, base station 101 schedules the transmission of messages in the paging channel accordingly to the slot cycle indexes assigned. If the number of mobile stations in base station 101 increases beyond the predetermined threshold(s), base station 101 turns off the flag indicator.

After that point, other mobile stations entering the base station operate in full slot cycle mode. In this manner, the present invention can throttle the load of reduced slot cycle users.

According to an advantageous embodiment of the present invention, base station 101 is capable of restricting the use of the reduced slot cycle mode of operation by selected individual mobile stations, instead of restricting all new or existing mobile stations. To accomplish this, reduced slot cycle controller 270 causes BTS controller 225 to transmit to a target mobile station an individual traffic channel message (e.g., ITSPM, UHDM, GHDM) in which the flag indicator is disabled. When the target mobile station receives the traffic channel message, the target mobile station detects that the flag indicator is disabled and the target mobile station will only operate in full slot cycle mode thereafter.

This ability to disable the reduced slot cycle mode in individual mobile stations gives reduced slot cycle controller 270 tremendous flexibility in throttling the use of reduced slot cycle mode. The setting of the flag indicator can be made dependent on the other characteristics, such as quality of service (QoS), mobile station priority (i.e., high paying customers), and the like. Thus, base station 101 can use a system parameters control message to restrict the use of reduced slot cycle mode by new mobile stations entering the coverage area of base station 101, while at the same time allowing existing mobile station to continue to use the reduced slot cycle mode. Additionally, base station 101 can use a system parameters control message or a traffic channel control message to restrict the use of reduced slot cycle mode by selected existing mobile stations, while at the same time allowing other existing mobile station to continue to use the reduced slot cycle mode.

In FIG. 2, reduced slot cycle controller 270 and traffic monitor 260 are associated with base transceiver subsystem 220. It should be understood that, this configuration is by way of illustration only and should not be construed to limit the scope of the present invention. Those skilled in the art will understand that in other embodiments, reduced slot cycle controller 270 and traffic monitor 260 may be associated with base station controller 210. in still other embodiments, reduced slot cycle controller 270 and traffic monitor 260 may be associated with both BTS 220 and BSC 210. What is essential is that traffic monitor 260 be able to monitor the traffic loading of one or more of the base transceiver subsystems associated with a base station controller 210 and that reduced slot cycle controller 270 be able to cause base station 101 to transmit an overhead channel message (e.g., system parameters message, extended system parameters message) or a traffic channel message (e.g., ITSPM, UHDM, GHDM) in which the flag is enabled or disabled.

Additionally, the present invention does not require reduced slot cycle controller 270 to use particular algorithm(s) or predetermined threshold(s) in order to restrict use of the reduced slot cycle mode. In fact, it is believed that such algorithm(s) or predetermined threshold(s) will vary widely from vendor to vendor and from deployment to deployment, depending on the physical capabilities of each base station and the environment in which each base station operates.

According to an advantageous embodiment of the present invention, base station 101 is further capable of selectively assigning particular mobile stations to different reduced slot cycle modes, so that mobile stations in the same cell may operate at different slot cycle rates. To accomplish this, reduced slot cycle controller 270 causes BTS controller 225 to transmit to one or more target mobile stations special-purpose paging channel messages (e.g., General Page message (GPM), Release Order message, etc.) and/or special-purpose traffic channel messages (e.g., ITSPM) in which different reduced slot cycle index (SCI) values are specified for different mobile stations. When each target mobile station receives the paging channel message or traffic channel message, each target mobile station determines its own SCI value and thereafter operates in the specified slot cycle mode.

Figure 3:
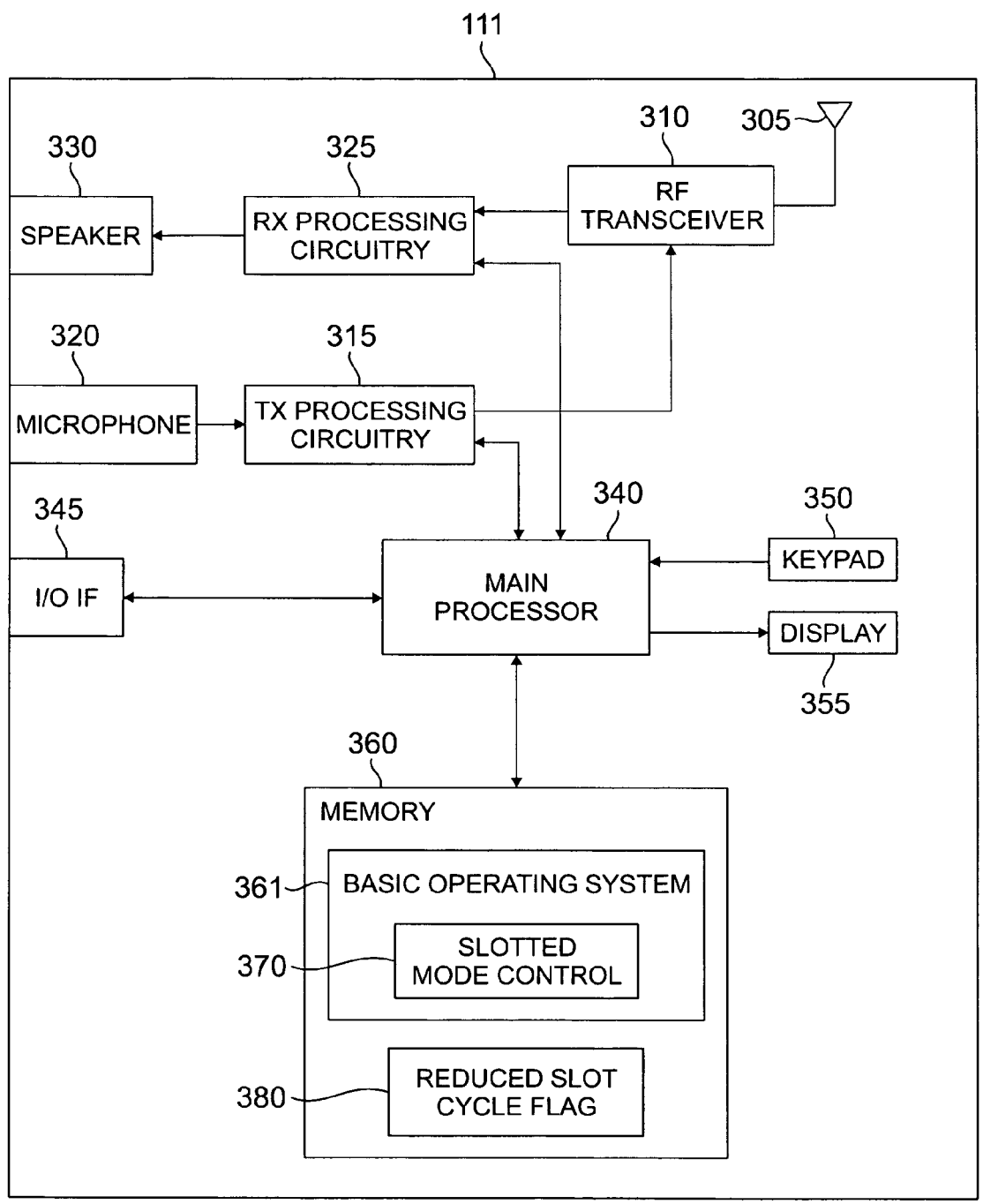
FIG. 3 illustrates an exemplary wireless mobile station according to an advantageous embodiment of the present invention.

FIG. 3 illustrates wireless mobile station 111 according to an advantageous embodiment of the present invention. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361, slotted mode control algorithm 370, and reduced slot cycle flag field 380.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present invention, main processor 340 is a microprocessor or microcontroller. Memory 360 is coupled to main processor 340. According to an advantageous embodiment of the present invention, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers.

I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Basic operating system 361 includes slotted mode control algorithm 370. According to the principles of the present invention, when mobile station 111 enters an idle state, main processor 340 may execute slotted mode control algorithm 370 and thereby enter a full slot cycle mode of operation or a reduced slot cycle mode of operation. Slotted mode control algorithm 370 checks the value stored in reduced slot cycle flag field 380 in order to determine whether to operate in full slot cycle mode or reduced slot cycle mode. Reduced slot cycle flag field 380 stores the value of the flag indicator transmitted by base station 101 in the overhead channel message or traffic channel message.

Figure 4:
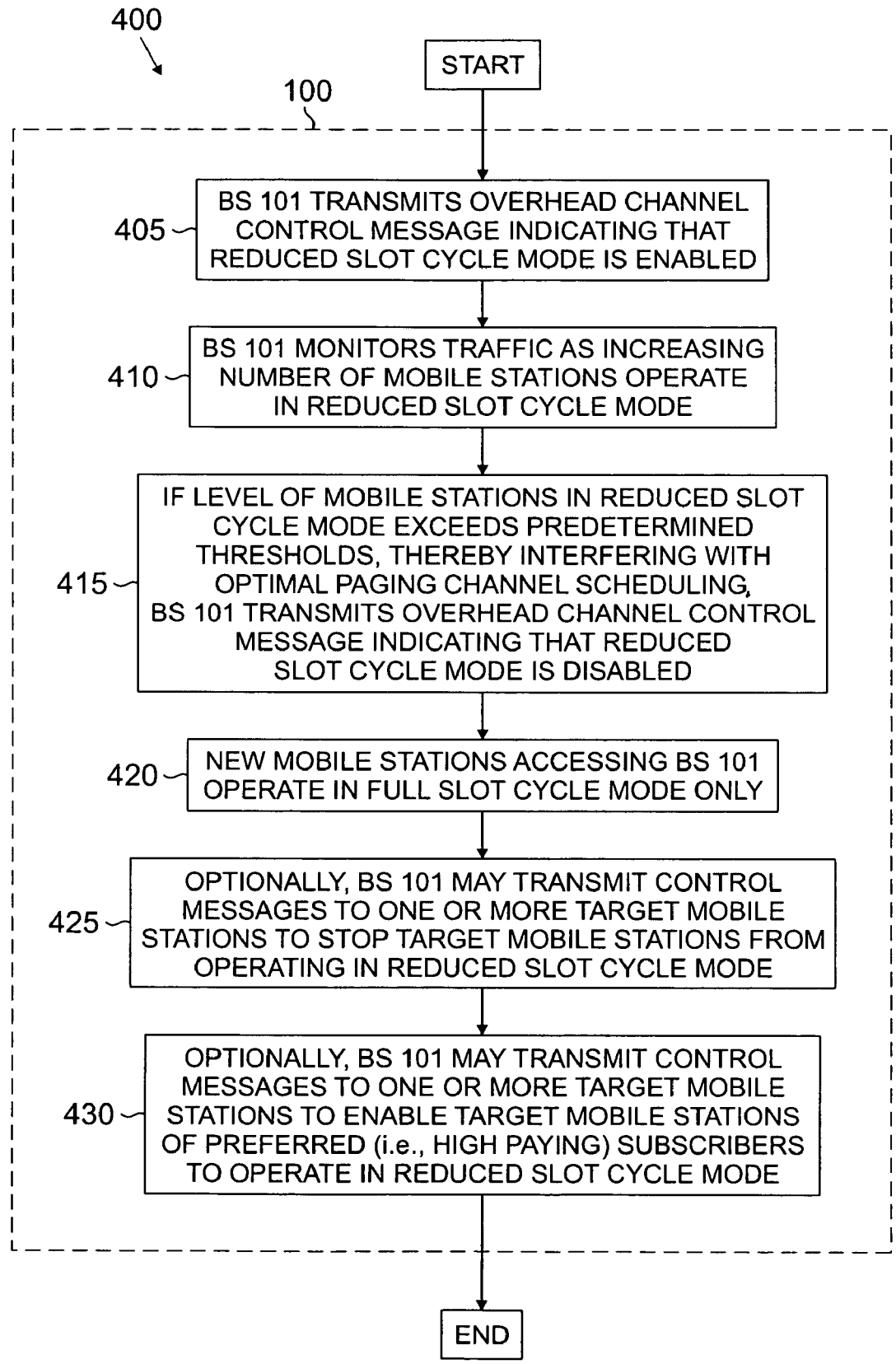
FIG. 4 is a flow diagram illustrating the operation of the reduced slot cycle mode in the wireless network according to one embodiment of the present invention.

FIG. 4 depicts flow diagram 400, which illustrates the operation of the reduced slot cycle mode in wireless network 100 according to one embodiment of the present invention. Initially, base station 101 transmits an overhead channel control message indicating that the reduced slot cycle mode is enabled (process step 405). Base station 101 then monitors traffic as an increasing number of mobile stations operate in the reduced slot cycle mode (process step 410). At some point, if the level of mobile stations operating in the reduced slot cycle mode exceeds one or more predetermined thresholds (thereby interfering with optimal paging channel scheduling), base station 101 transmits an overhead channel control message indicating that the reduced slot cycle mode is disabled (process step 415). Thereafter, new mobile stations accessing base station 101 operate in the full slot cycle mode only (process step 420).

Optionally, base station 101 may transmit control messages to one or more target mobile stations already operating in the reduced slot cycle mode in order to stop those target mobile stations from continuing to operate in the reduced slot cycle mode (process step 425). Optionally, base station 101 also may transmit control messages to one or more target mobile stations to enable the target mobile stations of preferred (i.e., high paying) subscribers to operate in the reduced slot cycle mode (process step 430).

As mentioned above, the present invention comprises apparatuses and techniques for controlling the SCI mode of particular mobile stations. According to the principles of the present invention, this may be accomplished by: 1) instructing a particular mobile station of its selected slot cycle index using the General Page message (GPM) when the mobile station is monitoring the paging channel; and 2) instructing a particular mobile station of its selected slot cycle index (SCI) in the In-Traffic Systems Parameters message (ITSPM) when the mobile station is on the traffic channel.

FIG. 5 illustrates a technique for changing the slot cycle index of a particular mobile station using a separate General Page message according to one embodiment of the present invention. The paging channel message sequence 500 in FIG. 5 includes a first General Page message comprising General Page message (GPM) header 501, Additional Page field (ADD_PFIELD) 502, and page records 503-505 (arbitrarily labeled Page Record 1, Page Record 2, and Page Record 3, respectively). The paging channel traffic in FIG. 5 also includes a second General Page message comprising General Page message (GPM) header 511, Additional Page field (ADD_PFIELD) 512, and page records 513 and 514 (arbitrarily labeled Page Record 4 and Page Record 5, respectively).

This technique uses different SCI values specific to a group of mobile stations within a sub cell of a base station. Accordingly, the base station transmits the first General Page message containing the Page Records of the mobile stations whose SCI needs to be changed to the same value. The CLASS_0_DONE field and the CLASS_1_DONE field of the first General Page message transmitted should be set to 0, so that the mobile stations are awake (if operating in the slotted mode) for the next General Page message to be received. Additional Page field 512 in the second General Page message specifies the new SCI value for the other group of mobile stations. Since a separate General Page message is used for each group, flexibility is provided for changing the SCI to different values within the same cell.

According to the principles of the present invention, the Additional Page fields 502 and 512 comprise a 4-bit Purpose field, a 4-bit Slot cycle Index field, and Number Record field (0 bits or 8 bits). The Purpose field indicates if the SCI change is for all page records (in which case, the Number Record field is 0 bits) or if the SCI change is only for the page records specified in the Number Record field (in which case, the Number Record field is 8 bits).

FIG. 6 illustrates a technique for changing in mass the slot cycle indexes of a group of mobile stations using General Page messages according to one embodiment of the present invention. The paging channel message sequence 600 in FIG. 6 includes a first General Page message comprising General Page message (GPM) header 601, Additional Page field (ADD_PFIELD) 602, and page records 603 and 604 (arbitrarily labeled Page Record 1 and Page Record 2, respectively). The paging channel traffic in FIG. 6 also includes a second General Page message comprising General Page message (GPM) header 611, Additional Page field (ADD_PFIELD) 612, and page records 613-616 (arbitrarily labeled Page Record 3, Page Record 4, Page Record 5, and Page Record 6, respectively).

In this technique, the base station packs the General Page messages of the mobile stations whose SCI value needs to be changed separately (e.g., 6 page records hash to a single slot, the SCI values of 4 mobile stations need to be changed.) Accordingly, the base station sends the first General Page message containing only two page records for the mobile stations whose SCI values doe not need to be changed. The base station sets the CLASS_0_DONE field and the CLASS_1_DONE field in the first General Page message to 0 to ensure that the mobile stations remain awake and see the second General Page message. The base station also sets ADD_LENGTH field to 0. The base station then sends the second General page message containing four page records whose SCI values need to be changed. In this instance, the base station sets the CLASS_0_DONE field and the CLASS_1_DONE field to 1.

According to the principles of the present invention, the Additional Page fields 602 and 612 comprise a 4-bit Purpose field, a 4-bit Slot cycle Index field, and Number Record field (0 bits or 8 bits). The Purpose field indicates if the SCI change is for all page records (in which case, the Number Record field is 0 bits) or if the SCI change is only for the page records specified in the Number Record field (in which case, the Number Record field is 8 bits).

Figure 7:
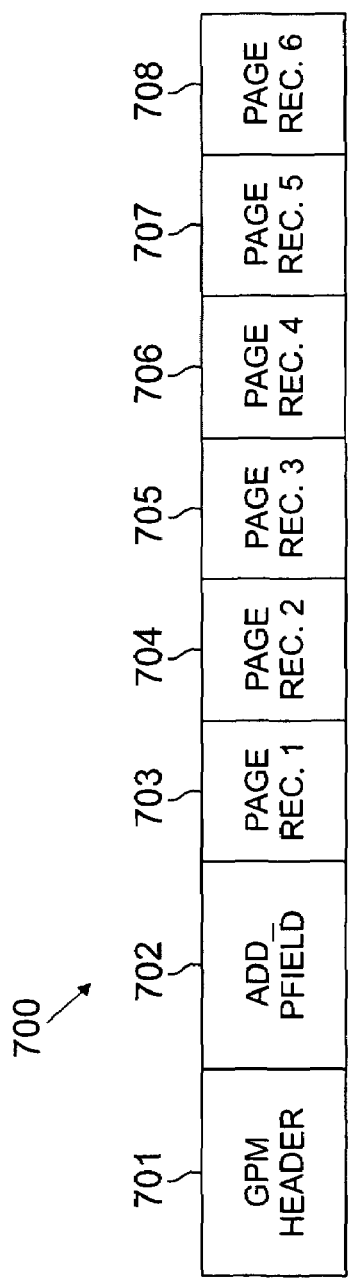
FIG. 7 illustrates another technique for changing in mass the slot cycle indexes of a group of mobile stations using General Page messages according to one embodiment of the present invention.

FIG. 7 illustrates another technique for changing in mass the slot cycle indexes of a group of mobile stations using General Page messages according to one embodiment of the present invention. The paging channel message sequence 700 in FIG. 7 includes a General Page message comprising General Page message (GPM) header 701, Additional Page field (ADD_PFIELD) 702, and page records 703-708 (arbitrarily labeled Page Record 1, Page Record 2, Page Record 2, Page Record 4, Page Record 5 and Page Record 6, respectively).

In this technique, the base station changes the SCI value of the mobile stations in groups in a similar manner to the technique shown in FIG. 6. The base station packs together all of the General Page messages that hash to a single slot. The page records for the mobile stations whose SCI values need to be changed are packed in the beginning of the sequence. For example, in FIG. 7, there are six (6) page records that hash to a single slot. Of these six, the SCI values of four mobile stations need to be changed. When assembling the General Page message, the base station places the records of the four mobile stations whose SCI values need to be changed at the beginning (i.e., page records 703-708).

Additional page field 702 contains the number of page records (at the beginning of the sequence of page records) for mobile stations whose SCI values are being changed. According to the principles of the present invention, the Additional Page field 702 comprises a 4-bit Purpose field, a 4-bit Slot cycle Index field, and Number Record field (0 bits or 8 bits). The Purpose field indicates if the SCI change is for all page records (in which case, the Number Record field is 0 bits) or if the SCI change is only for the page records specified in the Number Record field (in which case, the Number Record field is 8 bits).

Figure 8:
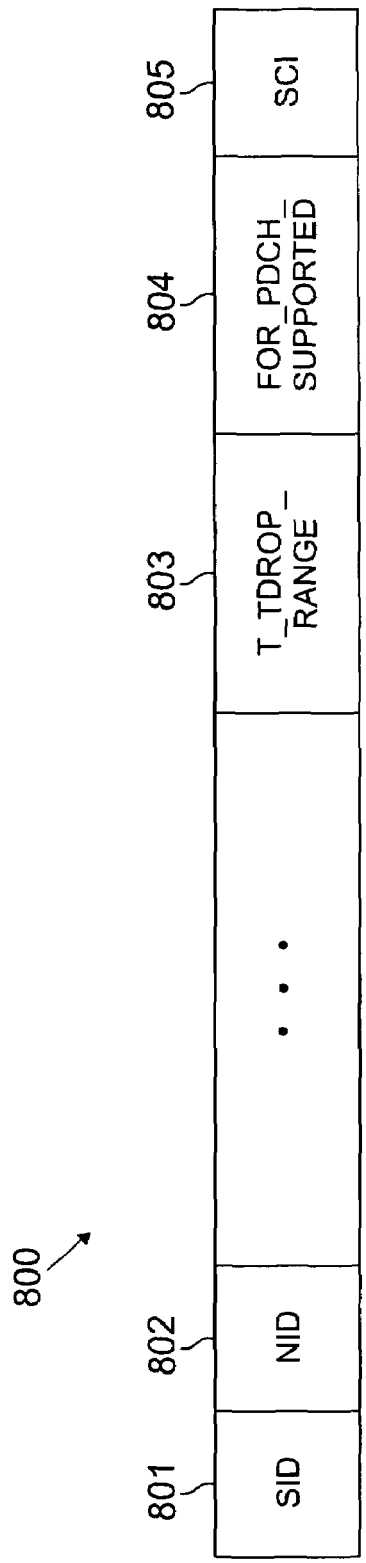
FIG. 8 illustrates a technique for changing the slot cycle index of a particular mobile station when the mobile station is operating in a traffic channel according to one embodiment of the present invention.

FIG. 8 illustrates a technique for changing the slot cycle index of a particular mobile station when the mobile station is operating in a traffic channel according to one embodiment of the present invention. The traffic channel message in FIG. 7 comprises In-Traffic Systems Parameter (ITSP) message 800. ITSP message 800 comprises, among other fields, System Identification (SID) field 801, Network Identification (NID) field 802, T_TDROP_RANGE field 803, FOR_PDCH_SUPPORTED field 804, and Slot Cycle index (SCI) field 805. When a mobile station goes from the active state to the dormant state, the base station may instruct the mobile station to change its SCI value using the SCI field 805 in ITSP message 800.

Thus, the techniques shown in FIGS. 5-8 provide the capability of independently controlling the SCI values of each and every mobile station. Depending on the application that a mobile station is executing, the base station may allocate a particular SCI value to a particular mobile station without causing an overload on the base station, while at the same time conserving the battery life of the mobile stations.

Figure 9:
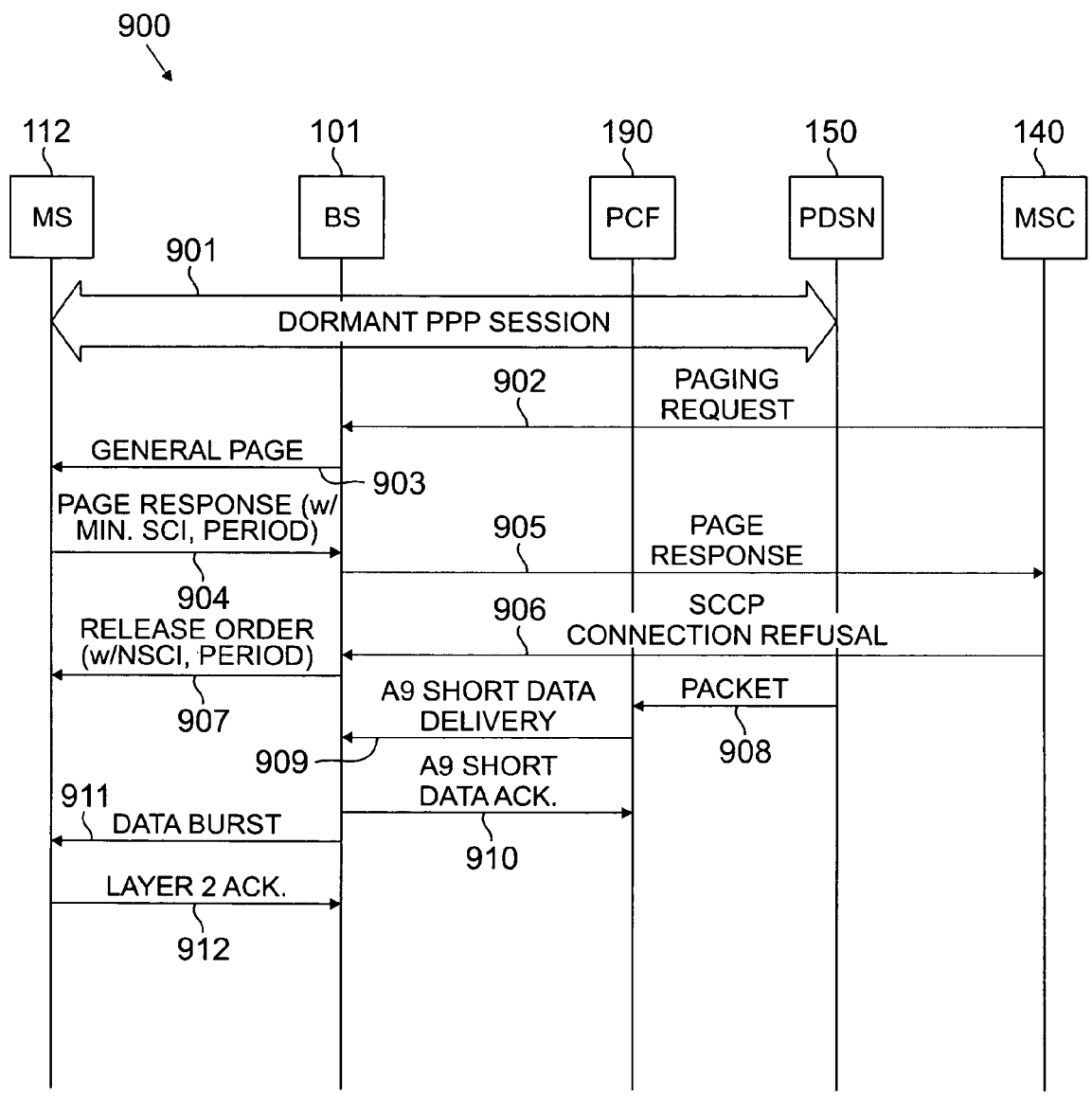
FIG. 9 illustrates a technique for changing the slot cycle index of a particular mobile station using the Release Order message according to one embodiment of the present invention.

FIG. 9 illustrates message flow diagram 900, which depicts a technique for changing the slot cycle index of a particular mobile station using the Release Order message according to one embodiment of the present invention. FIG. 9 depicts the use of this technique in a mobile station-terminated packet data session. Initially, mobile station (MS) 112 is engaged in dormant point-to-point protocol (PPP) session 901 with PDSN 150.

At some point, Paging Request message 902 directed to MS 112 arrives at base station (BS) 101 while MS 112 is dormant. Paging Request message 902 may be generated by, for example, a chat application. In response, BS 101 transmits General Page message 903 to MS 112. MS 112 then responds by transmitting Page Response message 904, which has been modified to include a data field that contains the minimum reduced (or negative) slot cycle index value suggested by MS 112 and a time period requested by MS 112 during which MS 112 will operate using the suggested SCI. BS 101 relays Page Response message 905 to MSC 140. MSC 140 may transmit SCCP Connection Refusal message 906 (or another appropriate message) back to BS 101.

After receiving Page Response message 904 (containing the minimum supported SCI value and requested time period, BS 101 also transmits Release Order message 907, which has been modified to include a data field that contains the reduced (or negative) SCI value that BS 101 will use to page MS 112. The NSCI value sent by BS 101 may be different than the requested reduced SCI. Optionally, BS 101 may include a time period in Release Order message 907 that is different than the time period requested by MS 112.

At some point, data packet 908 arrives at PCF unit 190. PCF unit 190 transmits data packet 908 to BS 101 using A9 Short Data Delivery message 909. BS 101 responds by transmitting A9 Short Data Acknowledgment message 910 back to PCF unit 190. Next, BS 101 transmits the data packet in Data Burst message 911 to MS 112 at the reduced SCI rate that BS 101 requested in Release Order message 907. Finally, MS 112 transmits Layer 2 Acknowledgment message 912 to BS 101.

If the battery power of MS 112 is low, the minimum-supported SCI value transmitted by MS 112 equals the preferred slot cycle index value. When BS 101 is loaded, BS 101 can send the slot cycle index value other than the minimum-supported SCI value indicated by MS 112.

Figure 10:
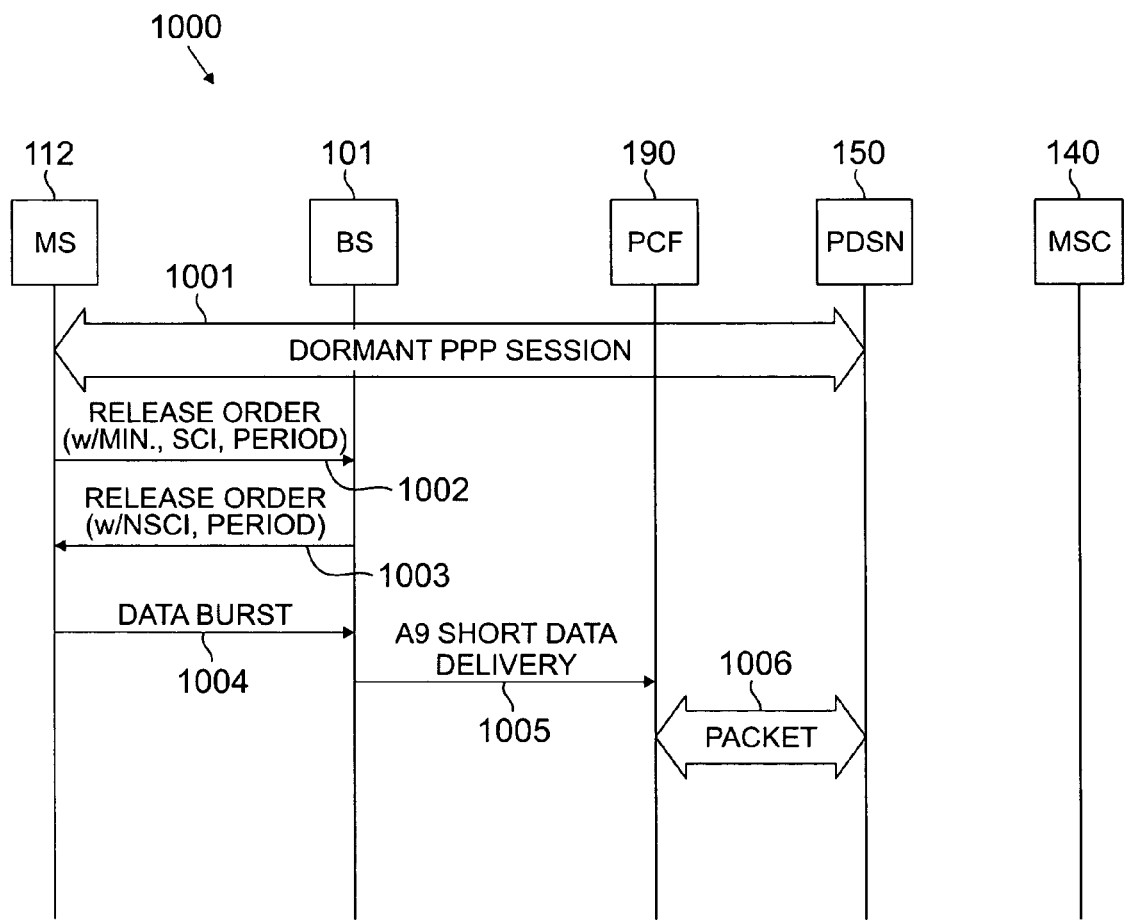
FIG. 10 illustrates a technique for changing the slot cycle index of a particular mobile station using the Release Order message according to another embodiment of the present invention.

FIG. 10 illustrates message flow diagram 1000, which depicts a technique for changing the slot cycle index of a particular mobile station using the Release Order message according to another embodiment of the present invention. FIG. 10 depicts the use of this technique in a mobile station-originated packet data session. Initially, mobile station (MS) 112 is engaged in dormant point-to-point protocol (PPP) session 1001 with PDSN 150.

At some point, MS 112 become active and transmits data. To accomplish this, MS 112 transmits to BS 101 Release Order message 1002, which has been modified to include a data field that contains the minimum reduced (or negative) slot cycle index (SCI) value suggested by MS 112 and a time period requested by MS 112 during which MS 112 will operate using the suggested reduced SCI. BS 101 responds by transmitting Release Order message 1003, which has been modified to include a data field that contains the reduced (or negative) SCI value that BS 101 will use to page MS 112. The NSCI value sent by BS 101 may be different than the requested reduced SCI. Optionally, BS 101 may include a time period in Release Order message 1003 that is different than the time period requested by MS 112.

Next, MS 112 transmits data in Data Burst message 1004 to MS 112 at the reduced SCI rate that BS 101 requested in Release Order message 1003. BS 101 transmits the data to PCF unit 190 using A9 Short Data Delivery message 1005. Packet session 1006 is then established between PCF unit 190 and PDSN 150.

Figure 11:
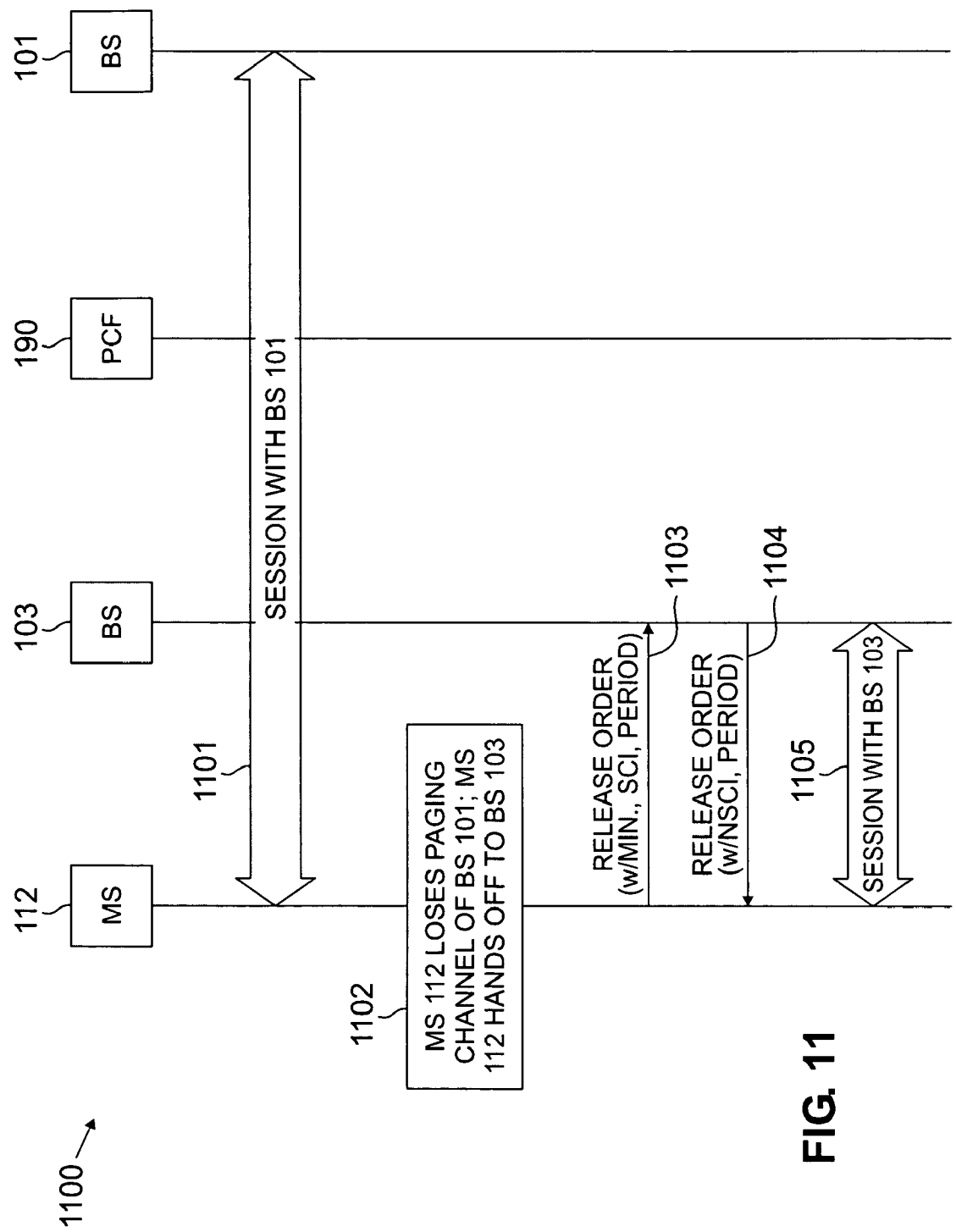
FIG. 11 illustrates a technique for changing the slot cycle index of a particular mobile station during an idle handoff operation according to one embodiment of the present invention.

FIG. 11 illustrates message flow diagram 1100, which depicts a technique for changing the slot cycle index of a particular mobile station during an idle handoff operation according to one embodiment of the present invention. Initially, mobile station (MS) 112 is engaged in session 1101 with BS 101. It is assumed that MS 112 and BS 101 operate at the reduced SCI that BS 101 would have requested based on prior information obtained from MS 112 (minimum supported SCI).

At some point, MS 112 loses the paging channel of BS 101 and is handed off to BS 103, as indicated by event block 1102. During the idle handoff, MS 112 transmits to BS 103 Release Order message 1103, which has been modified to include a data field that contains the minimum reduced (or negative) slot cycle index (SCI) value suggested by MS 112 and a time period requested by MS 112 during which MS 112 will operate using the suggested reduced SCI.

BS 103 responds by transmitting Release Order message 1104, which has been modified to include a data field that contains the reduced (or negative) SCI value that BS 103 will use to page MS 112. The NSCI value sent by BS 101 may be different than the requested reduced SCI. Optionally, BS 101 may include a time period in Release Order message 1004 that is different than the time period requested by MS 112. Thereafter, MS 112 and BS 103 conduct data session 1105.

Figure 12:
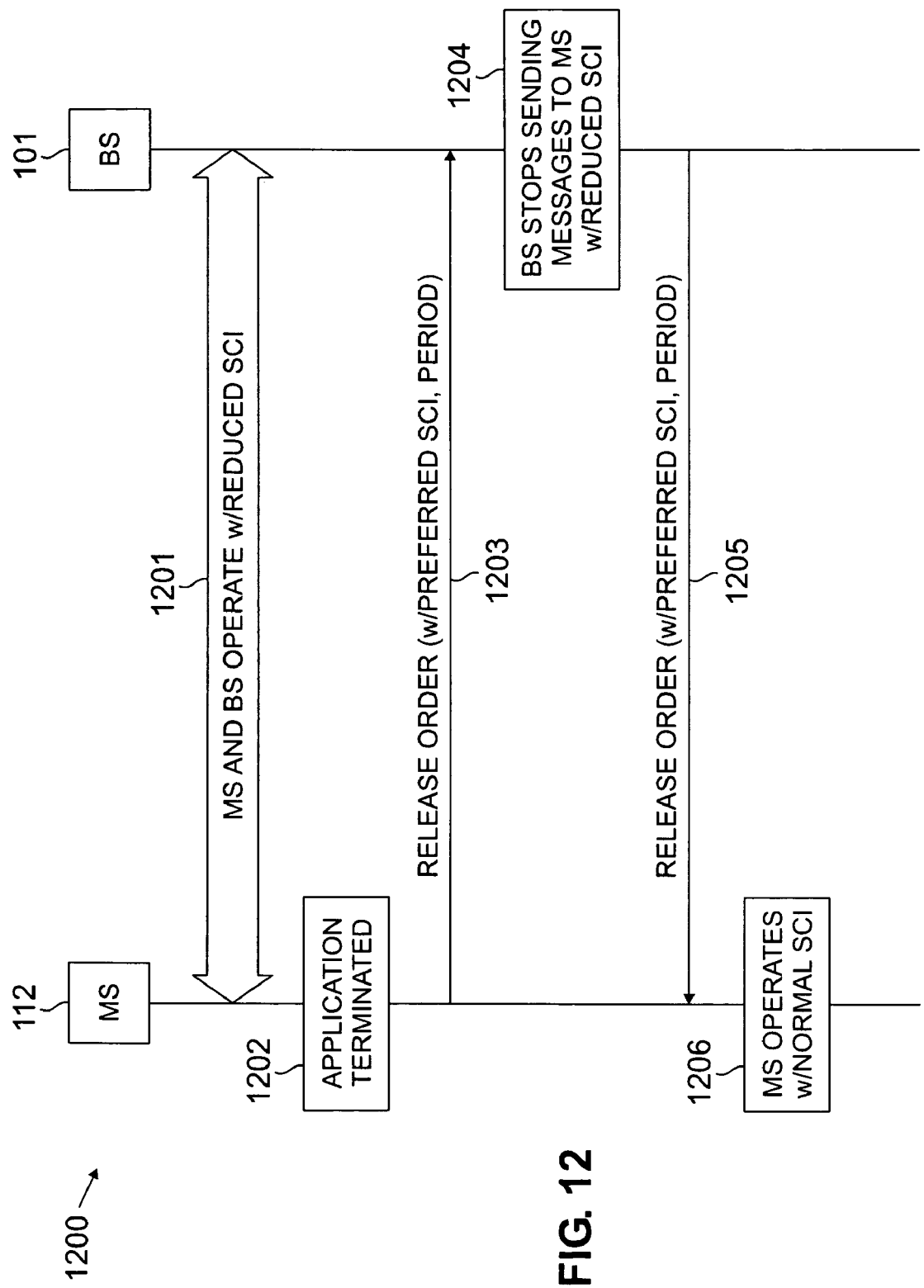
FIG. 12 illustrates a technique for changing a mobile station from reduced slot cycle index operations to normal slot cycle index operations according to one embodiment of the present invention.

FIG. 12 illustrates message flow diagram 1200, which depicts a technique for changing a mobile station from reduced slot cycle index operations back to normal slot cycle index operations according to one embodiment of the present invention. Initially, mobile station (MS) 112 is engaged in session 1201 with BS 101. It is assumed that MS 112 and BS 101 operate at the reduced SCI that BS 101 would have requested based on prior information obtained from MS 112 (minimum supported SCI).

At some point, MS 112 terminates the application that used the reduced slot cycle index, as indicated by event block 1202. MS 112 transmits to BS 101 Release Order message 1203, which has been modified to include a data field that contains the normal (or preferred) slot cycle index (SCI) value (e.g., 1.28 seconds) requested by MS 112. Optionally, Release Order message 1203 may also comprise a time period (e.g., 5 hours, continuously) requested by MS 112 during which MS 112 will operate using the normal SCI value. In response, BS 101 immediately stops transmitting messages to MS 112 using a reduced SCI value, as indicated by event block 1204, and begins transmitting using the normal (or preferred) slot cycle index value.

BS 101 also transmits Release Order message 1205, which has been modified to include a data field that contains the normal (or preferred) SCI value that BS 101 will use to page MS 112. Optionally, BS 101 may include the time period in Release Order message 1205 that was (optionally) requested by MS 112. Thereafter, MS 112 operates with the normal SCI value, as indicated by event block 1206.

Figure 13:
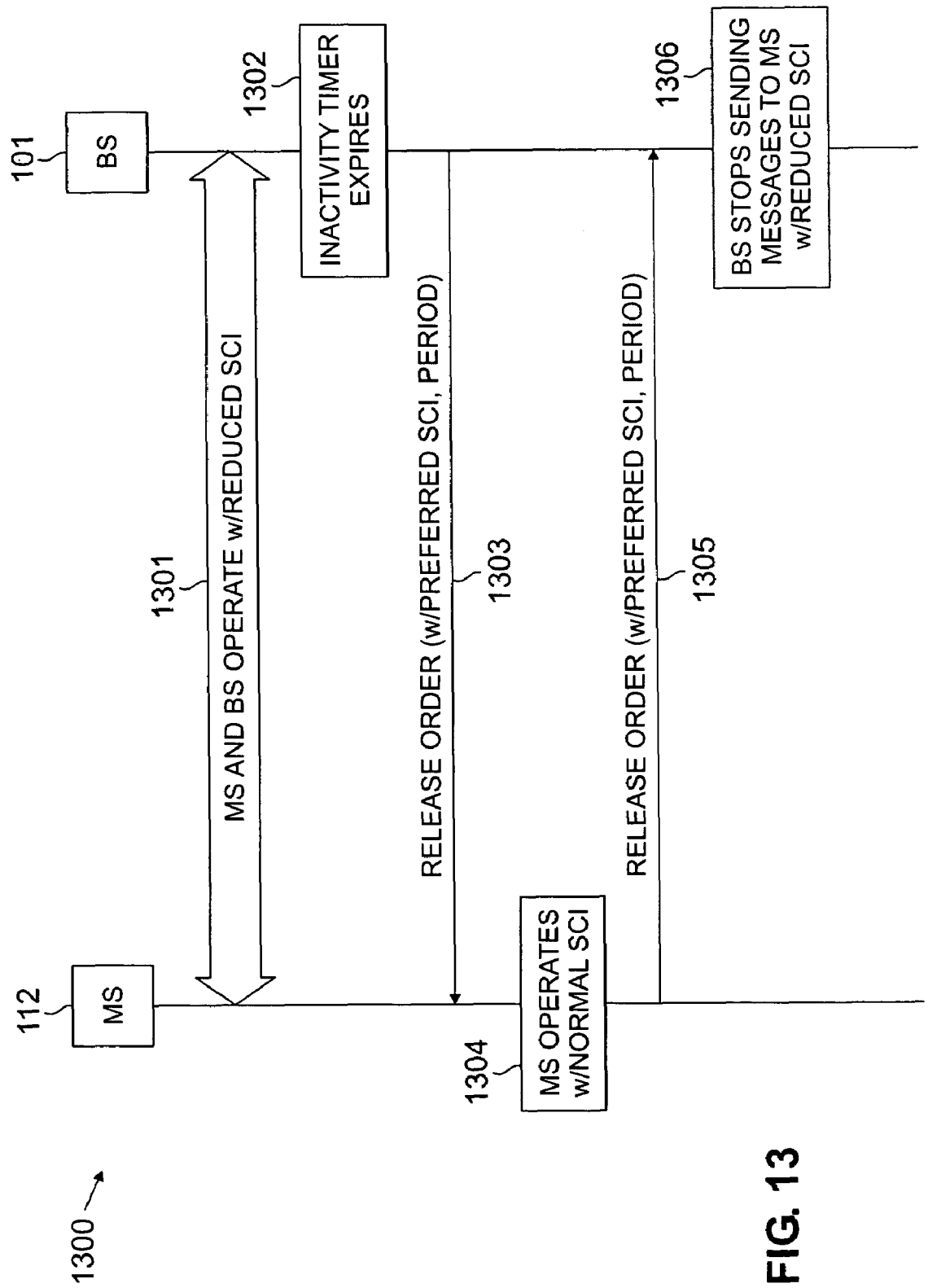
FIG. 13 illustrates a technique for changing a mobile station from reduced slot cycle index operations to normal slot cycle index operations according to another embodiment of the present invention.

FIG. 13 illustrates message flow diagram 1300, which depicts a technique for changing a mobile station from reduced slot cycle index operations to normal slot cycle index operations according to another embodiment of the present invention. FIG. 13 shows the call-flow when mobile station (MS) 112 wants to revert back to the original SCI, but no information is available until the inactivity timer of BS 101 expires. The inactivity timer tracks the time duration during which BS 101 does not receive any information from MS 112 (i.e., no activity occurs).

Initially, MS 112 is engaged in session 1301 with BS 101. It is assumed that MS 112 and BS 101 operate at the reduced SCI that BS 101 would have requested based on prior information obtained from MS 112 (minimum supported SCI). At some point, the inactivity timer in BS 101 expires, as indicated by event block 1302. In response, BS 101 transmits to MS 112 Release Order message 1303, which has been modified to include a data field that contains the normal (or preferred) slot cycle index (SCI) value requested by BS 101. Optionally, Release Order message 1303 may comprise a time period (e.g., 5 hours, continuously) requested by BS 101 during which MS 112 will operate using the normal SCI value.

MS 112 immediately begins to operate at the normal slot cycle index value, as indicated by event block 1304. MS 112 also transmits to BS 101 Release Order message 1305, which has been modified to include a data field that contains the normal (or preferred) slot cycle index (SCI) value requested by BS 101. Optionally, Release Order message 1305 may also comprise the time period requested by BS 101 during which MS 112 will operate using the normal SCI value. In response, BS 101 immediately stops transmitting messages to MS 112 using a reduced SCI value, as indicated by event block 1306, and begins transmitting using the normal SCI value.

Figure 14:
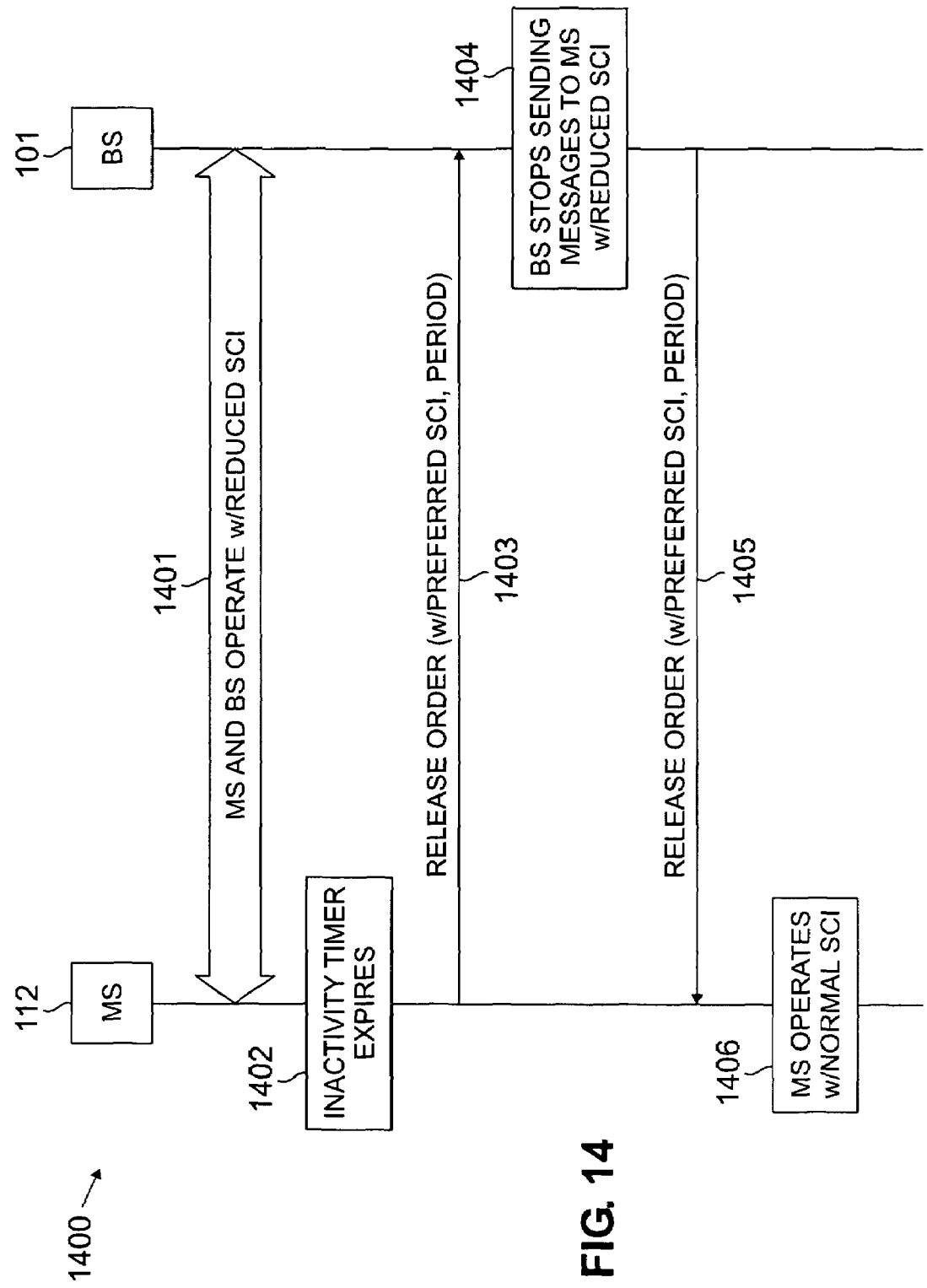
FIG. 14 illustrates a technique for changing a mobile station from reduced slot cycle index operations to normal slot cycle index operations according to still another embodiment of the present invention.

FIG. 14 illustrates message flow diagram 1400, which depicts a technique for changing a mobile station from reduced slot cycle index operations to normal slot cycle index operations according to still another embodiment of the present invention. FIG. 14 shows the call-flow when mobile station (MS) 112 wants to revert back to the normal SCI value, but no information is available until the inactivity timer of MS 112 expires. The inactivity timer of MS 112 tracks the time duration during which MS 112 does not receive any information from BS 101 (i.e., no activity occurs).

Initially, MS 112 is engaged in session 1401 with BS 101. It is assumed that MS 112 and BS 101 operate at the reduced SCI that BS 101 would have requested based on prior information obtained from MS 112 (minimum supported SCI). At some point, the inactivity timer in MS 112 expires, as indicated by event block 1402. In response, MS 112 transmits to BS 101 Release Order message 1403, which has been modified to include a data field that contains the normal (or preferred) slot cycle index (SCI) value requested by MS 112. Optionally, Release Order message 1403 may also comprise a time period (e.g., 5 hours, continuously) requested by MS 112 during which MS 112 will operate using the normal SCI value. In response, BS 101 immediately stops transmitting messages to MS 112 using a reduced SCI value, as indicated by event block 1404, and begins transmitting using the normal (or preferred) slot cycle index value.

BS 101 also transmits Release Order message 1405, which has been modified to include a data field that contains the normal (or preferred) SCI value that BS 101 will use to page MS 112. Optionally, BS 101 may include the time period in Release Order message 1405 that was (optionally) requested by MS 112. Thereafter, MS 112 operates with the normal SCI value, as indicated by event block 1406.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a base station capable of controlling the use of the reduced slot cycle mode by a selected one of a plurality of mobile stations communicating with said base station, said base station comprising:

a message controller capable of transmitting a Page message to a first mobile station notifying said first mobile station that a data session between said base station and said first mobile station is being activated; and a reduced slot cycle controller coupled to said message controller and capable of receiving a Page Response message from said first mobile station, in response to said Page message, said Page Response message comprising a minimum reduced slot cycle index (SCI) value requested by said first mobile station, wherein said reduced slot cycle controller, in response to receipt of said Page Response message, causes said message controller to transmit to said first mobile station a first Release Order message comprising a modified data field containing a selected reduced slot cycle index (SCI) value at which said first mobile station will operate, and wherein, after said data session is complete, said reduced slot cycle controller is further capable of transmitting a second Release Order message comprising a normal SCI value at which said first mobile station will operate.

2. The base station as set forth in claim 1 wherein a slot cycle duration corresponding to said selected reduced SCI value transmitted by said base station is different than a slot cycle duration corresponding to said minimum reduced slot cycle index (SCI) value requested by said first mobile station.

3. The base station as set forth in claim 2 wherein said slot cycle duration corresponding to said selected reduced SCI value transmitted by said base station is at least as great as a slot cycle duration corresponding to said minimum reduced slot cycle index (SCI) value requested by said first mobile station.

4. The base station as set forth in claim 1 wherein said Page Response message further comprises a requested time period during which said first mobile station will operate using said reduced slot cycle index (SCI) value requested by said first mobile station, and wherein said first Release Order message further comprises a selected time period during which said first mobile station will operate using said selected reduced SCI value.

5. The base station as set forth in claim 4 wherein said selected time period transmitted by said base station is different than said requested time period requested by said first mobile station.

6. The base station as set forth in claim 5 wherein said selected time period transmitted by said base station is at least as great as said requested time period requested by said first mobile station.

7. A wireless network comprising a plurality of base stations, each of said base stations capable of controlling the use of the reduced slot cycle mode by a selected one of a plurality of mobile stations communicating with said wireless network, said each base station comprising:

a message controller capable of transmitting a Page message to a first mobile station notifying said first mobile station that a data session between said each base station and said first mobile station is being activated; and a reduced slot cycle controller coupled to said message controller and capable of receiving from said first mobile station a Page Response message comprising a minimum reduced slot cycle index (SCI) value requested by said first mobile station, wherein said reduced slot cycle controller, in response to receipt of said Page Response message, causes said message controller to transmit to said first mobile station a first Release Order message comprising a modified data field containing a selected reduced slot cycle index (SCI) value at which said first mobile station will operate wherein, after said data session is complete, said reduced slot cycle controller is further capable of transmitting a second Release Order message comprising a normal SCI value at which said first mobile station will operate.

8. The wireless network as set forth in claim 7 wherein a slot cycle duration corresponding to said selected reduced SCI value transmitted by said each base station is different than a slot cycle duration corresponding to said minimum reduced slot cycle index (SCI) value requested by said first mobile station.

9. The wireless network as set forth in claim 8 wherein said slot cycle duration corresponding to said selected reduced SCI value transmitted by said each base station is at least as great as a slot cycle duration corresponding to said minimum reduced slot cycle index (SCI) value requested by said first mobile station.

10. The wireless network as set forth in claim 7 wherein said Page Response message further comprises a requested time period during which said first mobile station will operate using said reduced slot cycle index (SCI) value requested by said first mobile station, and wherein said first Release Order message further comprises a selected time period during which said first mobile station will operate using said selected reduced SCI value.

11. The wireless network as set forth in claim 10 wherein said selected time period transmitted by said each base station is different than said requested time period requested by said first mobile station.

12. The wireless network as set forth in claim 11 wherein said selected time period transmitted by said each base station is at least as great as said requested time period requested by said first mobile station.

13. For use in a base station of a wireless network, a method of controlling the use of the reduced slot cycle mode by a selected one of a plurality of mobile stations communicating with the base station, the method comprising the steps of:

transmitting a Page message to a first mobile station notifying the first mobile station that a data session between the base station and the first mobile station is being activated;

receiving from the first mobile station a Page Response message comprising a minimum reduced slot cycle index (SCI) value requested by the first mobile station;

in response to receipt of the Page Response message, transmitting to the first mobile station a first Release Order message comprising a modified data field containing a selected reduced slot cycle index (SCI) value at which the first mobile station will operate; and after the data session is complete, transmitting a second Release Order message comprising a normal SCI value at which the first mobile station will operate.

14. The method as set forth in claim 13 wherein a slot cycle duration corresponding to the selected reduced SCI value transmitted by the base station is different than a slot cycle duration corresponding to the minimum reduced slot cycle index (SCI) value requested by the first mobile station.

15. The method as set forth in claim 14 wherein the slot cycle duration corresponding to the selected reduced SCI value transmitted by the base station is at least as great as a slot cycle duration corresponding to the minimum reduced slot cycle index (SCI) value requested by the first mobile station.

16. The method as set forth in claim 13 wherein the Page Response message further comprises a requested time period during which the first mobile station will operate using the reduced slot cycle index (SCI) value requested by the first mobile station, and wherein the first Release Order message further comprises a selected time period during which the first mobile station will operate using the selected reduced SCI value.

17. The method as set forth in claim 16 wherein the selected time period transmitted by the base station is different than the requested time period requested by the first mobile station.

18. The method as set forth in claim 17 wherein the selected time period transmitted by the base station is at least as great as the requested time period requested by the first mobile station.

19. For use in a wireless network comprising a plurality of base stations, a mobile station that can selectively use the reduced slot cycle mode under the control of a first of the plurality of base stations, said mobile station comprising:
- a message controller capable of receiving a Page message from a first mobile station notifying said mobile station that a data session between said first base station and said mobile station is being activated; and
- a reduced slot cycle controller coupled to said message controller and capable of causing said message controller to transmit to said first base station a Page Response message comprising a minimum reduced slot cycle index (SCI) value requested by said mobile station,
- wherein said reduced slot cycle controller is further capable of receiving from said first base station a first Release Order message comprising a modified data field containing a selected reduced slot cycle index (SCI) value at which said mobile station will operate, and
- wherein, after said data session is complete, said reduced slot cycle controller is further capable of transmitting a second Release Order message comprising a normal SCI value at which said first mobile station will operate.

20. The mobile station as set forth in claim 19 wherein a slot cycle duration corresponding to said selected reduced SCI value transmitted by said first base station is different than a slot cycle duration corresponding to said minimum reduced slot cycle index (SCI) value requested by said mobile station.

21. The mobile station as set forth in claim 20 wherein said slot cycle duration corresponding to said selected reduced SCI value transmitted by said first base station is at least as great as a slot cycle duration corresponding to said minimum reduced slot cycle index (SCI) value requested by said mobile station.

22. The mobile station as set forth in claim 19 wherein said Page Response message further comprises a requested time period during which said mobile station will operate using said reduced slot cycle index (SCI) value requested by said mobile station, and wherein said first Release Order message further comprises a selected time period during which said mobile station will operate using said selected reduced SCI value.

23. The mobile station as set forth in claim 22 wherein said selected time period transmitted by said first base station is different than said requested time period requested by said mobile station.

24. The mobile station as set forth in claim 23 wherein said selected time period transmitted by said first base station is at least as great as said requested time period requested by said mobile station.

\* \* \* \* \*